(12) United States Patent
Townley et al.

(10) Patent No.: US 8,369,792 B2
(45) Date of Patent: *Feb. 5, 2013

(54) METHODOLOGY TO ANALYZE SECTOR CAPACITY IN DATA-ONLY MOBILE-WIRELESS NETWORK

(75) Inventors: Scott Anthony Townley, Gilbert, AZ (US); Derek Hongwei Bao, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/035,250

(22) Filed: Feb. 25, 2011

(65) Prior Publication Data

US 2011/0149782 A1    Jun. 23, 2011

Related U.S. Application Data

(63) Continuation of application No. 11/987,831, filed on Dec. 5, 2007, now Pat. No. 7,933,557.

(51) Int. Cl.
| | | |
|---|---|---|
| *H04B 17/00* | (2006.01) | |
| *H04B 7/00* | (2006.01) | |
| *H04B 7/185* | (2006.01) | |
| *H04B 3/46* | (2006.01) | |
| *H04W 72/00* | (2009.01) | |
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04Q 1/20* | (2006.01) | |

(52) U.S. Cl. ............... 455/67.11; 455/453; 455/500; 370/229; 370/318; 375/224; 375/225

(58) Field of Classification Search ............. 455/63.1, 455/67.11, 67.13, 69, 453, 500, 501, 522; 370/318, 310, 317, 229; 375/224, 225

See application file for complete search history.

(56) References Cited

U.S. PATENT DOCUMENTS

| | | |
|---|---|---|
| 6,173,185 B1 | 1/2001 | Bernardin et al. |
| 6,708,036 B2 | 3/2004 | Proctor et al. |
| 6,996,374 B1 | 2/2006 | Bao et al. |
| 7,296,083 B2 | 11/2007 | Barham et al. |
| 7,711,530 B2 | 5/2010 | Cioffi et al. |
| 7,933,557 B1 * | 4/2011 | Townley et al. ........... 455/67.11 |
| 2002/0077113 A1 | 6/2002 | Spaling et al. |
| 2004/0141473 A1 * | 7/2004 | Buot ............................. 370/311 |
| 2005/0081410 A1 | 4/2005 | Furem et al. |

(Continued)

OTHER PUBLICATIONS

Zhar, Jerrold H., "Data Transformations in Regression," Biostatistical Analysis, Fourth Edition, Department of Biological Sciences Northern Illinois University, Prentice Hall, Upper Saddle River, New Jersey, 1999.

(Continued)

*Primary Examiner* — Andrew Wendell

(57) ABSTRACT

Infrastructure network service measurements of time needed to complete data transfers are used to determine the capacity of a technology sector of a wireless packet data communication base station, such as a 1xEV-DO sector, using infrastructure network service measurements. The process, for example, may predict when the radio-frequency link between wireless data subscribers and a wireless base station becomes sufficiently congested that each user experiences reduced data speeds. The determination of capacity can be made down to the sector-carrier (a single carrier within a base station sector) level. The prediction can be cast in terms of time, which allows network service providers to plan the growth of their base stations to meet subscriber needs.

20 Claims, 6 Drawing Sheets

U.S. PATENT DOCUMENTS

| | | | |
|---|---|---|---|
| 2005/0113106 A1* | 5/2005 | Duan et al. | 455/452.2 |
| 2005/0169229 A1* | 8/2005 | Cho et al. | 370/344 |
| 2006/0026019 A1* | 2/2006 | Sethi et al. | 705/1 |
| 2006/0079267 A1 | 4/2006 | Kim et al. | |
| 2006/0240782 A1 | 10/2006 | Pollman et al. | |
| 2007/0155395 A1* | 7/2007 | Gopalakrishnan et al. | 455/453 |
| 2008/0016214 A1* | 1/2008 | Galluzzo et al. | 709/226 |
| 2008/0037420 A1* | 2/2008 | Tang | 370/229 |
| 2008/0069059 A1* | 3/2008 | Yagyu et al. | 370/336 |
| 2008/0102772 A1* | 5/2008 | Gandhi | 455/187.1 |
| 2008/0139236 A1 | 6/2008 | Barrett | |
| 2009/0017861 A1 | 1/2009 | Wu et al. | |

OTHER PUBLICATIONS

Inventors' Declaration for Compliance with Duty of Disclosure Under 37 C.F.R. §§ 1.56 with Exhibits A-D, Nov. 2009.

Entire Prosecution of U.S. Appl. No. 11/987,831 to Townley, et al., filed Dec. 5, 2007, entitled "Methodology to analyze sector capacity in data-only mobile-wireless network".

* cited by examiner

METHODOLOGY TO ANALYZE SECTOR CAPACITY IN DATA-ONLY MOBILE-WIRELESS NETWORK

RELATED APPLICATION

This application is a Continuation of U.S. patent application Ser. No. 11/987,831, filed on Dec. 5, 2007 now U.S. Pat. No. 7,933,557, the entire contents of which application are hereby incorporated by reference.

TECHNICAL FIELD

The present subject matter relates to techniques and equipment to analyze sector capacity in a data-only type mobile-wireless network, such as a 1xEV-DO network, using network service measurements of data communication performances (e.g. time needed to complete data transfers).

BACKGROUND

In recent years, mobile communications have become a widely used part of everyday life. As user demand for wider varieties of mobile service have expanded, network operators have begun deploying networks that provide wireless wide area communications utilizing packet transport. Such networks support traditional voice and text messaging services, and they support a variety of multimedia data services including services that may require substantially larger throughput than was available through older network technologies. For example, operators of networks based on CDMA (code division multiple access) technologies migrated from IS-95, to cdma200 and are now migrating to single carrier of evolution—data-only (1xEV-DO) network technologies. The 1xEV-DO system is a CDMA based data-only system optimized for high-speed packet data services.

As with any network technology, the network operator must manage the network resources and when appropriate deploy additional or upgraded resources to meet increasing demand for services through the network. For management purposes, a number of techniques have been developed to measure the traffic load on wireless network resources, particularly for earlier network technologies.

One approach is to assign a fixed maximum value (theoretical capacity) of usage to all sector-carriers in a network, based on theoretical calculations. Planning can then be based on the extent to which actual and/or expected usage approaches the theoretical capacity of particular cells of the network. It is well known in the industry that in actual fact, each individual sector of a cell in a system has a different maximum capacity, depending on height above average terrain, clutter environment, geographic distribution of users, etc. Hence, this simplistic approach does not provide an accurate estimate of capacity, in many real-world situations.

Another approach is to estimate the Erlang capacity of each sector carrier by estimating the number of actual users of the sector. The method entails: (1) obtaining operational measurement of transmitted power and peak number of users (note that the quantity "peak number of users" is obtainable from some infrastructure manufacturers); (2) finding the quotient to find "average power per user;" (3) finding the maximum number of permissible users, by dividing the maximum available transmit power by the average power per user; (4) converting the maximum number of users to the equivalent maximum Erlangs of traffic using an Erlang table lookup for a specified grade-of-service; and (5) dividing the maximum Erlangs of traffic by the current Erlangs of traffic to estimate "growth factor." This method, while more accurate than the first method, has significant disadvantages in application thereof to a wireless network, particular a data-only type wireless network. The Erlang model is predicated on discrete, equal capacity, limited resources (e.g. lines, or trunks in telephony parlance). However, resources of cell sectors in a public wireless network are not used in a discrete and equal manner. In a 1xEV-DO type network, for example, the limited resource is transmission time, users are assigned differing amounts of time based on their link quality and the amount of data they are to receive. Therfore the Erlang models of the past hundred years are not applicable to this field.

Earlier iterations of cellular networks allocated users exactly "enough" power to provide service, but no more, to minimize interference with other coded communications on the band. For such networks, a technique was developed that utilized resource usage data and resource power level data from the wireless network to develop metrics, for example, regarding capacity, usage or performance. However, in the newer technology data-only networks, the power level may be a constant and not a limited resource. For example, in a 1xEV-DO network, the forward channel transmit power for transmitting from the base station to mobile stations is fixed, and users are allocated varying amounts of time for the downstream transmission of their data.

For a data-only network, in which power is fixed, capacity planning has used lagging indicators. Those indicators were the average data speed for the entire sector, or a sample user data speed obtained from drive testing (operating a mobile station through a particular sector, e.g. while driving). The average data speed for the sector is a "noisy" data point and subject to significant variability as more users access the network. Drive testing is time-consuming and expensive, and only yields data valid for the precise time the drive testing was done. Neither method is a leading indicator. Hence, a current deficiency could be detected, but there was no effective way to extrapolate current condition to a potential future deficiency.

Hence a need exists for an accurate technique to estimate values of capacity for resources of a data-only wireless communication network based on actual operations of the network, which allows extrapolation of current operational conditions to predict future performance or capacity needs.

SUMMARY

The teachings herein improve over the art and address one or more of the above noted problems with respect to measuring and/or predicting capacity in a data-only mobile wireless communication network, by performing a time-trending analysis based on data communication performance measurements, such as time needed to complete data transfers. The analysis, for example, can be used to determine at what future point a deficiency will exist, by taking continuous hourly data so that single-time or "snapshot" views are not used. The disclosed examples also apply statistical treatments to the raw data to reduce data variability and improve accuracy.

Hence, methods, computer systems or machines, and programs are disclosed for analyzing capacity of an air-link resource of a base station in a data-only mobile wireless communication network. Data is collected regarding transmission of data over of the air-link resource of a base station to one or more mobile stations during each of some number of time intervals. The collected data includes (i) total transmitted data for each interval, (ii) a measure of total time taken during each interval to transmit the data, and (iii) average number of users being sent data over the air-link resource during each interval. One or more logarithmic linear regressions are performed, and the results are used to measure aspects of current capacity of the resource and/or to estimate parameters relating to further capacity.

In one example, the method entails performing three logarithmic linear regressions. The first regression is a linear regression on data points relating to the logarithm of the total transmitted data for each interval versus the logarithm of the measure of total time taken during each interval to transmit the data, for the plurality of time intervals. A second regression is a linear regression on data points relating to the logarithm of the total transmitted data for each interval versus the logarithm of the average number of users, for the plurality of time intervals. The third regression is a linear regression on data points relating to the logarithm of the average number of users versus each logarithm of the measure of total time taken during each interval to transmit the data, for the plurality of time intervals. In this exemplary method, a result the linear regressions is processed to determine one or more operational characteristics relating to capacity of the air-link resource of the base station.

The processing of results of the linear regressions may be used to determine a variety of operational characteristics relating to capacity of the air-link resource. Slopes of the first and second regressions may be used to determine average data throughput for the sector carrier and an average throughput per user for data transmissions using the sector carrier. Extrapolation enables determinations of sector throughput, throughput per user (average user throughput) or the maximum number of users, when the resource is fully busy. As another example, it is possible to set a minimum value of throughput per user that will be considered acceptable, and then to determine the number of users that may receive data transmissions on the sector carrier when the average user throughput falls to that minimum level. Another operational characteristic, which useful in predicting future needs, is a growth factor. In an example, the growth factor may be determined from an estimate of maximum number of users divided by the current number of users. Typically, the base station resource is a sector or even a specific carrier of the sector used for downstream or forward link transmissions to mobile stations.

Another exemplary method entails performing a linear regression on data points relating to the logarithm of the total transmitted data for each interval versus the logarithm of the measure of total time taken during each interval to transmit the data, for the plurality of time intervals. An average throughput for data transmission using the resource is determined from the slope of the linear regression. A maximum number of users of the resource that can be supported at the minimum value of average user throughput also is determined. The current number of users supported by the resource is determined, for example by averaging numbers of users for all the intervals during which data is collected. It is then possible to calculate a growth factor based on the maximum number of users and the current number of users. If a multiplicative growth factor is desired, for example, the maximum number of users is divided by the current number of users.

The examples discussed herein also encompass machines for analyzing capacity of an air-link resource of a base station in a data-only mobile wireless communication network, the base station serving one or more wireless mobile stations. One such machine includes a programmable processor, a storage medium coupled to the processor and an executable program stored by the medium. Execution to the program by the processor causes the processor to implement a sequence of steps relating to the capacity analysis. The machine collects data regarding transmission of data over of the air-link resource of the base station to the one or more mobile stations during a number of time intervals. The collected data includes (i) total transmitted data for each interval, (ii) a measure of total time taken during each interval to transmit the data, and (iii) average number of users being sent data over the air-link resource during each interval. The machine also performs one or more logarithmic linear regressions based at least in part on the collected data. Using the one or more logarithmic linear regressions, the machine may determine a growth factor with respect to the resource. Also, the machine may extrapolate from at least one of logarithmic linear regressions to determine number of users at which average throughput per user for data transmission on the carrier falls to a selected value of minimum acceptable data throughput per user.

Various units of measure can be used with the above-discussed capacity analysis techniques with equivalent utility. The examples measure data in Mbytes for data volume, although one can use kilobits, bits, bytes, or any other conventional usage metric representing data traffic. The measure of total time taken during each interval to transmit the data can utilize time in seconds or a relative time such as a percentage of the interval that the resource was busy (% SlotsBusy) can be used.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
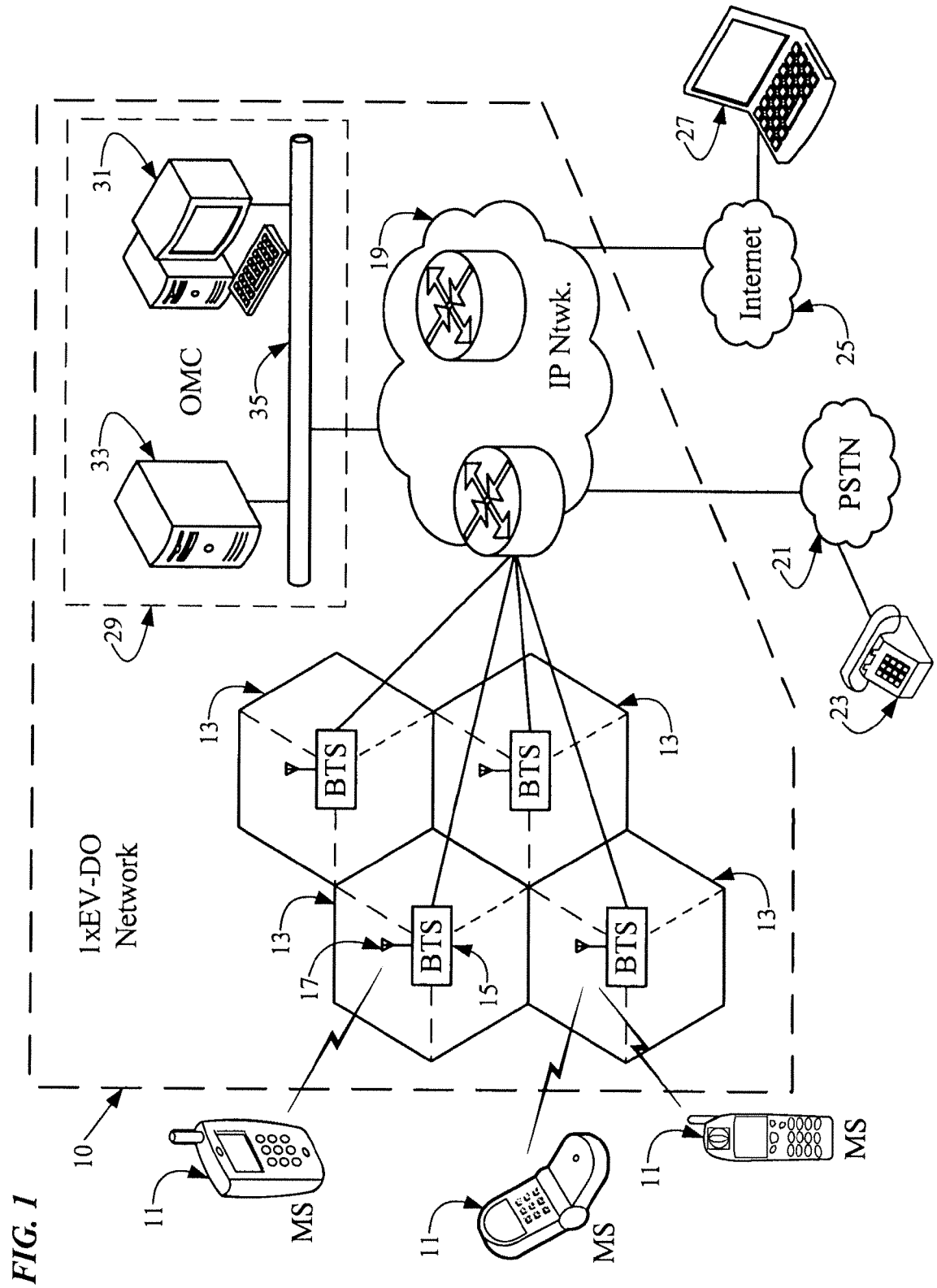
FIG. 1 is a simplified block diagram of communications networks and devices, including a data-only wireless network and associated processing equipment for performing a data analysis of capacity of the wireless network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Techniques are discussed below for performing a time-trending analysis of data communications through a data-only mobile-wireless communication, e.g. to determine at what future point a deficiency will exist. The examples use continuous hourly data representing times required to complete data transmissions to users and apply a linear regression routine to the data. One mathematical requirement of regression analysis is that variability is a random process, independent of the variables being regressed, which may not always be true for the measurements obtained from a data-only type network. Hence, in the example, the regression process is performed on the logarithms of the measurement quantities. This process may predict when the radio-frequency link between wireless data subscribers and wireless base stations becomes sufficiently congested that each user experiences reduced data speeds. The determination of capacity can be made down to the sector-carrier (a single carrier within a base station sector) level. The prediction can be cast in terms of time, which allows network service providers to plan the growth of their base stations to meet subscriber needs.

The regression coefficients, for example, can be used to determine operational characteristics of the sector-carrier, such as average sector throughput, average user throughput, by extrapolation—the sector throughput and user throughput corresponding to full usage of existing capacity (100%), and by further extrapolation—the number of additional users that can be added until the average user throughput falls to a certain minimum value determined by the network service provider. One exemplary use the regression results might be to calculate a sector-carrier "Growth Factor," which represents growth that a sector-carrier can accommodate before the minimum acceptable user throughput is reached.

To appreciate the performance measurement and prediction techniques, it may be helpful first to consider an example of a data-only network to which such teachings may be applied. For that purpose, reference now is made to the network example illustrated in the FIG. 1. As shown, a wide area wireless communication network 10 provides mobile communication services to a variety of mobile stations (MSs) 11, using data-only technologies. The present teachings are applicable in general to data-only networks of various types. The exemplary network 10 is a CDMA type network sometimes referred to as an evolution data-only (EV-DO) network, such as a 1xEV-DO network.

The illustration includes idealized geographic layout of several cells 13 of the exemplary wireless communication network 10, to which a process that predicts resource capacities and/or usage may be applied. While the network diagram shows only four cells 13 for convenience, in practice, the actual number of cells may be smaller or may be much larger. Each of the cells 13 includes a base station, typically at a site at or near the center of the wireless coverage area of the cell. The base station or "BS" comprises a base transceiver system (BTS) 15 and an associated antenna system 17. The base station is the part of radio network that sends and receives RF signals to/from the wireless mobile stations 11 it currently serves. The BTS 15 includes the transmitters, and receivers at a site and is responsible for the control, monitoring, and supervision of calls made to and from each mobile station 11 within its cellular serving area. A base station controller (BSC) not separately shown assigns and reassigns channels to the mobile stations 11 and monitors the signal levels to recommend hand-offs to other bases stations.

In the example, the base station in each cell 13 has directional antennas to provide communications into three sectors formed with in the cell 13, as represented by the dotted dividing lines within the cells. For such a sectored arrangement, the antenna system 17 of the cell would typically include three directional antennas (or three sets of directional antennas) to provide the communications for the three cell sectors. Those skilled in the art will recognize that some cells may utilize omni-directional antennas. Also, sectorized cells 13 may have as few as two directional antennas or more than three directional antennas, to divide the cells into fewer or more sectors, as deemed appropriate for the particular service area. Each of the directional antennas radiates downlink communications on at least one carrier and receives uplink communications on at least one carrier within the sector of the cell 13.

The present concepts are applicable to various different wireless technologies that utilize data-only communications to support all services through the network (e.g. voice, data, multimedia). For purposes of discussion only, the network 10 represents an 1xEV-DO type network. The 1xEV-DO communication network 10 provides mobile voice telephone communications as well as packet data services, for numerous mobile stations 11. A mobile station, for example, may take the form of a smart mobile telephone station, that is to say a mobile telephone enhanced with display and user input capabilities to support certain text and image communications, such as text messaging, email, picture and/or video communication and web browsing applications. Today, such mobile telephones typically take the form portable handsets, although they may be implemented in other form factors. Another mobile station may be a portable computing device, comprising a wireless modem card inserted into a handheld or laptop personal computer (PC) or the like. Another mobile station might take the form of a personal digital assistant (PDA) or similar device incorporating a wireless transceiver compatible with the particular type of packet data service offered by the network 10. Of course, the mobile stations with packet data communication capabilities may take other forms or connect to a variety of other data devices that may enable use of the network communication services.

The network 10 also includes a traffic network 19, which carries the user communications for the mobile stations 11 to and from the BTSs 15. In an 1xEV-DO implementation, the network 19 is a high-speed packet switched data network comprising a number of packet switches/routers connected to the BTS transceivers 15. The packet data network 19 will include a variety of switching and routing nodes to provide packet transport and interconnections to various other networks. For simplicity, the packet transport network 19 is shown generally as a network cloud of routers, as the elements of that network are not particularly significant to the present discussion and should generally be well known to those skilled in the data communication art.

For purposes of this discussion, the network 10 enables any and all users of the mobile stations 11 to initiate and receive various forms of user traffic via packet switched data communications. Such communications include, for example voice communications to or from the public switched telephone network (PSTN) 21 with telephone type devices represented generally by the telephone 23. Communications supported by the 1xEV-DO network 10 may also include communications to the public data network 25 referred to as the Internet for various communications to or from computers 27 having Internet access. Although not shown, the packet data services through the network 10 may also allow communications with other networks such as private intranets. The packet data communications allow users of the mobile stations to send to or receive data from other digital devices that otherwise have access to the Internet 27, such as servers, hosts and personal computers coupled to the Internet 27, as well as to or from other mobile stations 11. Hence, the illustrated 1xEV-DO network 11 supports a variety of multimedia voice and data services, using digital packet communications over the air link. Supported services include Voice over IP (VoIP) type telephone communications, as well as high-speed web browsing, just to name two exemplary services.

The intent is to provide an enhanced technique for determining capacity of an air-link resource of a base station in a data-only type wireless communication network, such as the exemplary 1xEV-DO network 10. The examples use continuous hourly data representing times during the hours required to complete data transmissions to users' mobile stations 11, and the examples apply a linear regression routine to the data. For this purpose, a data processing system collects and processes operational measurement data from the BTS systems 15 of the various cells 13. The data processing system or machine collects data, including: (i) total transmitted data for each interval, (ii) a measure of total time taken during each interval to transmit the data, and (iii) average number of users being sent data over the air-link resource during each interval. The collected data for the measure of total time taken during each interval to transmit the data is converted to a percentage of the interval that the resource was busy during each of the intervals. One or more logarithmic linear regressions are performed on the collected data and/or on the percentage busy data, and the results are used to analyze aspects of current capacity of the sector carrier and/or to estimate parameters relating to further capacity. The analysis, for example, can be used to determine a growth factor, to determine at what future point a deficiency may exist, etc., to allow the network operator to make plans to meet future demands on capacity. The analysis may also help in identification of items, such as sectors/carriers that are under performing other similar resources, which the network operator can adjust or fine tune in order to improve performance and thus increase capacity without deploying additional equipment or resources. Those skilled in the art will understand that the data collection and processing functions may be implemented on any computer or other data processing device capable of communicating with the BTS systems 15, executing the appropriate data processing and supplying results of the analysis to a user such as a technician or engineer involved in operations and management of the network 10.

In the example, the service provider that operates the network 10 operates a network operations center, represented for example by the Operations-Maintenance Center (OMC) 29. The center 29 communicates with various network elements, such as the BTSs 15 in our example, via logically private data communications links. Although other transport could be used, the illustrated network utilizes channels on the same media and through the same nodes of the IP network 19 that carry customer traffic, rather than a physically separate network. Hence, the drawing shows the OMC center 29 with a communication link to the network 19, to enable two-way data communications for the OMC 29 to the BTS equipment of the various base stations. Other implementations might use a separate private data network and/or communicate with other elements that control the BTS equipment, such as a base station controller, to collect the relevant data.

OMC 29 will typically include a number of workstation terminals 31 implemented by PCs or the like, for use by operations and engineering personnel of the service provider. The OMC 29 also may include one or more host computers or other processing machines configured to operate as a server 33. A data network 35, such as a local area network (LAN), enables two-way data communication between the terminal stations 31 and the server 33 within the OMC. Although not shown, equipment in the OMC may also communicate data relating to operations including sector-carrier capacity information to remote computers or other data processing devices, e.g. to a mobile device 11 of operations and engineering personnel of the service provider or to such personnel when they utilize a remote personal computer like that shown by way of example as a PC 27 connected to the Internet 25.

For purposes of determining sector capacity in a network 10 of the type illustrated in FIG. 1, each BTS 15 reports hourly data, for each sector served by the base station and for each carrier used by one of the BTS transceivers 15, to the server 33. The server in turn processes the data to analyze trends and predict when the radio-frequency link between wireless data subscribers and a wireless base station may be expected to become sufficiently congested that each user experiences reduced data speeds. The server 33 in turn makes the resulting capacity information available to appropriate personnel, typically via a client program on a terminal device such as 11, 27 or 31.

Figures 2, 3:
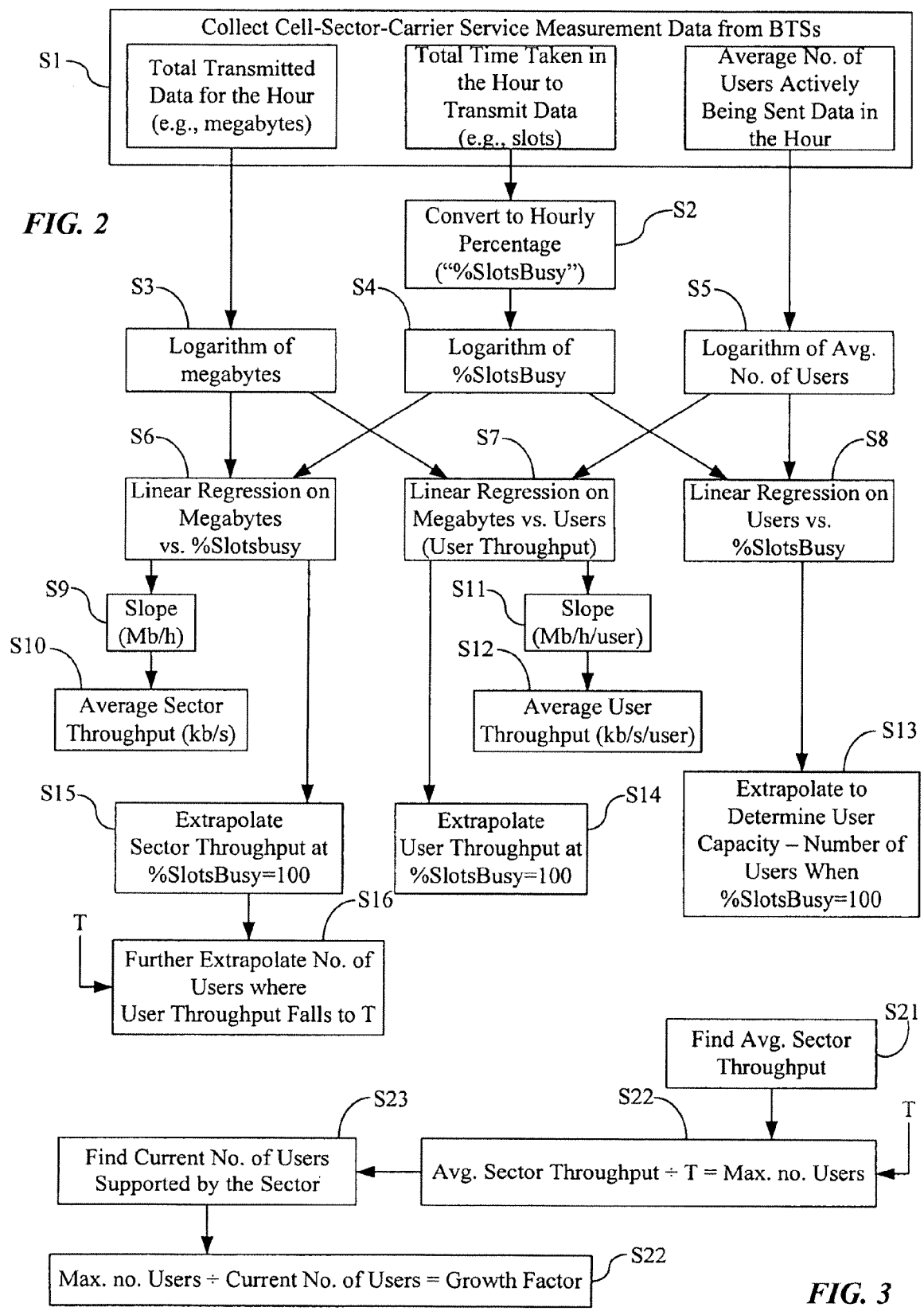
FIG. 2 is a flow chart useful in explaining an embodiment of a capacity analysis technique for a wireless communication network.
FIG. 3 is a flow chart useful in explaining an embodiment of a technique for computing a growth factor.

FIG. 2 is a simplified flow chart useful in explaining such a data collection and processing operation, as may be implemented in the 1xEV-DO network 10. Step S1 involves data gathering. The example uses hours for the time intervals. A study could be conducted for a single carrier or sector, but will typically involve reporting data and performing analyses for some number of sector-carriers, such as the transmit carriers used for all sectors of one or more cells. In the exemplary network 10 of FIG. 1, each BTS 15 having a carrier to be studied reports hourly data to the server 33, for each carrier used by one of the BTS transceivers 15 to transmit data into one or more of the sectors of the associated cell. For each sector-carrier under study, this collected data for each hourly interval consists of (1) the total transmitted data for the hour (e.g., megabytes); (2) the total amount of time taken to transmit this data, measured in "slots" (a slot is a standard 1xEV-DO unit and is equivalent to 1.66 milliseconds); and (3) the average number of (mobile) users who, at any point in the hour, are actively being sent data over the particular carrier. The server 33 collects the total data transmitted per hour, the total time slots taken for that data transmission within the hour, and the total number of users/mobile stations to whom the carrier was used to transmit data, over some designated time period for a study (consisting of some statistically sufficient number of intervals (hours in the example)). The total period for a study, for example, might be a day, a week, a 10-day period, 30 days or a month, or the like.

The server 33 converts the time data (total amount of time taken to transmit the user data) to a percentage of an entire hour (0-100%), based on the 1xEV-DO standard of 2.16 million slots/hour ("% SlotsBusy"), as shown at step S2 in FIG. 2.

One mathematical requirement of regression analysis is that variability is a random process, independent of the variables being regressed. However, in an operational 1xEV-DO system, as slot occupancy (percentage of slots used per hour) increases towards 100%, there is an ever-increasing variability in the speed at which data is delivered to mobile stations 11. This is primarily due to congestion and the variability in the strength and quality of the 1xEV-DO signal at any given mobile station 11. Statistical texts (Zar, Biostatistical Analysis, 4th ed., pp. 353-357) have shown that cases where variability is not sufficiently independent can be accurately handled using the logarithm of the regression variables. Hence, for a given carrier and sector of a cell, the server 33 obtains the logarithm of all the relevant data quantities, that is to say (1) the logarithm of the total transmitted data for the hour as shown at step S3; (2) the logarithm of the percentage of the hour required to transmit the user data ("% SlotsBusy") as shown at S4; and (3) the logarithm of the average number of users (mobile stations) who, at any point in the hour, are actively being sent data as shown at S5.

The server 33 applies the logarithms of the data to a linear regression routine in three pairs. Hence, in the example, the server 33 performs a linear regression on megabytes vs. % SlotsBusy at step S6. The server 33 performs a linear regression on megabytes vs. users at step S7; and the server 33 performs a linear regression on users vs. % SlotsBusy at S8.

The regression coefficients can be used to determine the following operational characteristics of the sector-carrier in question:

Average sector throughput in kilobits per second, from the regression slope of the logarithm of megabytes vs. logarithm of % SlotsBusy (steps S9 and S10).

Average user throughput in kilobits per second per user, from the regression slope of the logarithm of users v. logarithm of megabytes (steps S11 and S12).

By extrapolation of the linear regression of the logarithm of users vs. logarithm of % SlotsBusy, user capacity— number of users, when % SlotsBusy=100 (S13)

By extrapolation of the appropriate regressions, the sector throughput (S14) and user throughput (S15) corresponding to % SlotsBusy=100 (sector transmits all the time).

Based on the Sector Throughput at % SlotsBusy=100, the transmit data rate is known, e.g. in kb/s. Further increase in the number of users decreases the time available for each user. Hence, it becomes possible to further extrapolate to determine the number of additional users that can be added, even after % SlotsBusy=100, until the average user throughput falls to a certain minimum threshold value T determined by the 1xEV-DO service provider (step S16). For this purpose, The 1xEV-DO service provider can establish a minimum acceptable average throughput per user T, based on their business/marketing model. T, in our example, would be a threshold value in kb/s/user. Dividing the Sector Throughput at % SlotsBusy=100, by the value T gives the number of possible users at the reduced user throughput level (at step S16). A measure of the current number of users can then be used to estimate further growth potential in terms of the number of additional users that the existing resource will be able to support before degradation of service below the desired minimum set by the network operator. The measure of current number of users could be an overall average per hour for the period of the study, an average of busy hours for various days in the study, or the actual busiest hour of the entire study period (observed worst case).

Hence, the extrapolation to determine the number of users at which throughput per user falls to the minimum acceptable level T enables a computation of how much more overall subscriber growth can be supported on that sector-carrier until it will, in the future, just meet that minimum acceptable value, from the difference in the number of users determined in step S16 and the measure of the current number of users. Based on the rate at which the number of users are increasing (or expected to increase) over time, the network operator can use knowledge of the possible number of additional users that can be supported to predict when in the future a deficiency (degradation of the service to the minimum acceptable level T) will exist. To avoid unacceptable service degradation, the operator can make plans to deploy additional resources before the service falls to the minimum level.

The definition of "minimum acceptable" user throughput T can also be extended beyond a simple threshold value. By using the variance of the regressed data points, a family of probability bounds on the current and forecast user throughput can be constructed (e.g., x % probability that user throughput falls below y kilobits per second). This process permits the service provider to plan the future growth of the network to be "just-in-time," allows for precisely targeted augmentation, and tightens the alignment between advertised and actual network performance. These advantages result in lower capital costs and a reduction in sub-optimally-deployed capital.

The regression results determined in the process of FIG. 2 may also be used to calculate a sector-carrier "Growth Factor." Conceptually, the growth factor is simply the (multiplicative) growth that a sector-carrier can accommodate before the minimum acceptable user throughput T is reached. FIG. 3 is a process flow chart useful in explaining the computation of this growth factor. First (at S21), the computer finds the average sector throughput. For the growth factor computation, the average sector throughput may be the current average determined in step S10 or the throughput extrapolated for % SlotsBusy=100 determined at step S15, in the regression processing of FIG. 2. Second (at S22), the server divides that average sector throughput by the minimum acceptable user throughput T, to arrive at a maximum number of supportable users. Third (at S23), a representation is found of the current number of users supported by the sector-carrier. A common measure from telephony would be the "busy-hour" number of supported users, although other values or averages could be used. Then at step S24, the process involves calculating a growth factor by dividing the maximum number of supportable users by the current measure of supported users. This quotient then represents the maximum multiplicative growth possible while meeting performance standards. If the forecast user or usage growth exceeds the value of the growth factor, augmentation of the network is indicated. By using detailed, time-based forecasts of user/usage growth, a network service provider can target the required network augmentation precisely, as mentioned previously.

Additionally, the slope of the sector throughput (Mbytes vs. % SlotsBusy) regression line is an important operational interpretation. The sector throughput slope is essentially a measure of the radio-frequency efficiency of the sector-carrier, where higher slopes mean that the coverage area of the sector has a higher carrier-to-interference ratio (C/I). Therefore, a 1xEVDO system operator can take corrective action on their network, targeting sectors with lower slopes. Typical corrective action involves the reorientation of antennas and other generally-accepted industry practices to reduce interference between cell locations. Continuous implementation of this capacity analysis processing allows operators to evaluate the effectiveness of their corrective measures (sector throughput slope should measurably increase after changes).

Figure 5:
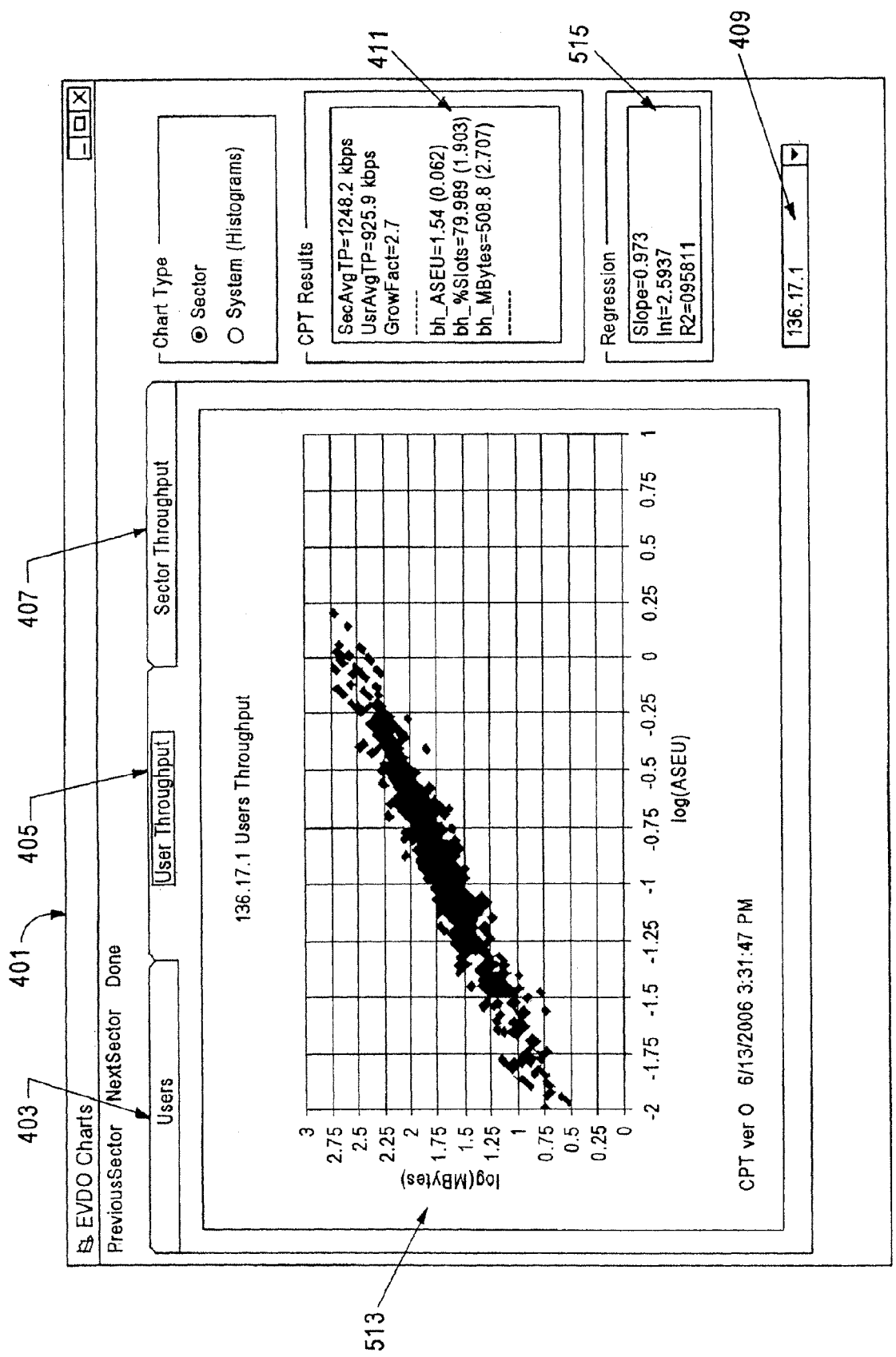
FIG. 5 is an exemplary window display depicting a logarithmic regression of Mbytes vs. users or User Throughput.
Figure 6:
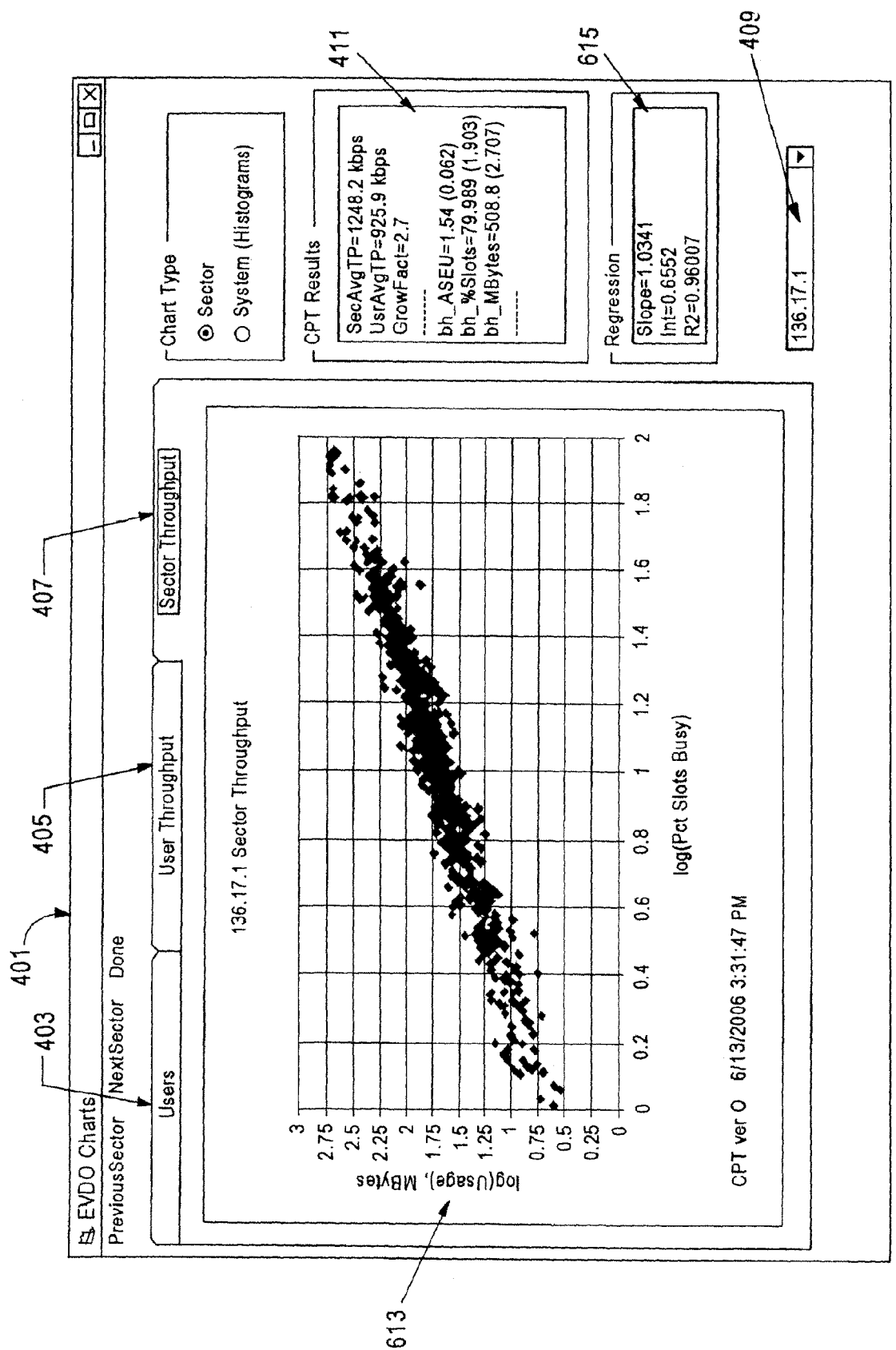
FIG. 6 is an exemplary window display illustrating a logarithmic regression of Mbytes vs. % SlotsBusy or Sector Throughput.

The processing as outlined above with regard to FIGS. 2 and 3 may produce a variety of different types of outputs of the resulting capacity related information, on the display of a user terminal device 31 or 27 (FIG. 1). Assuming a Windows® computing environment, FIGS. 4 to 6 illustrate several examples of possible displays as they might appear upon selection of tabs in a window, as they might result from the processing of FIGS. 2 and 3.

Figure 4:
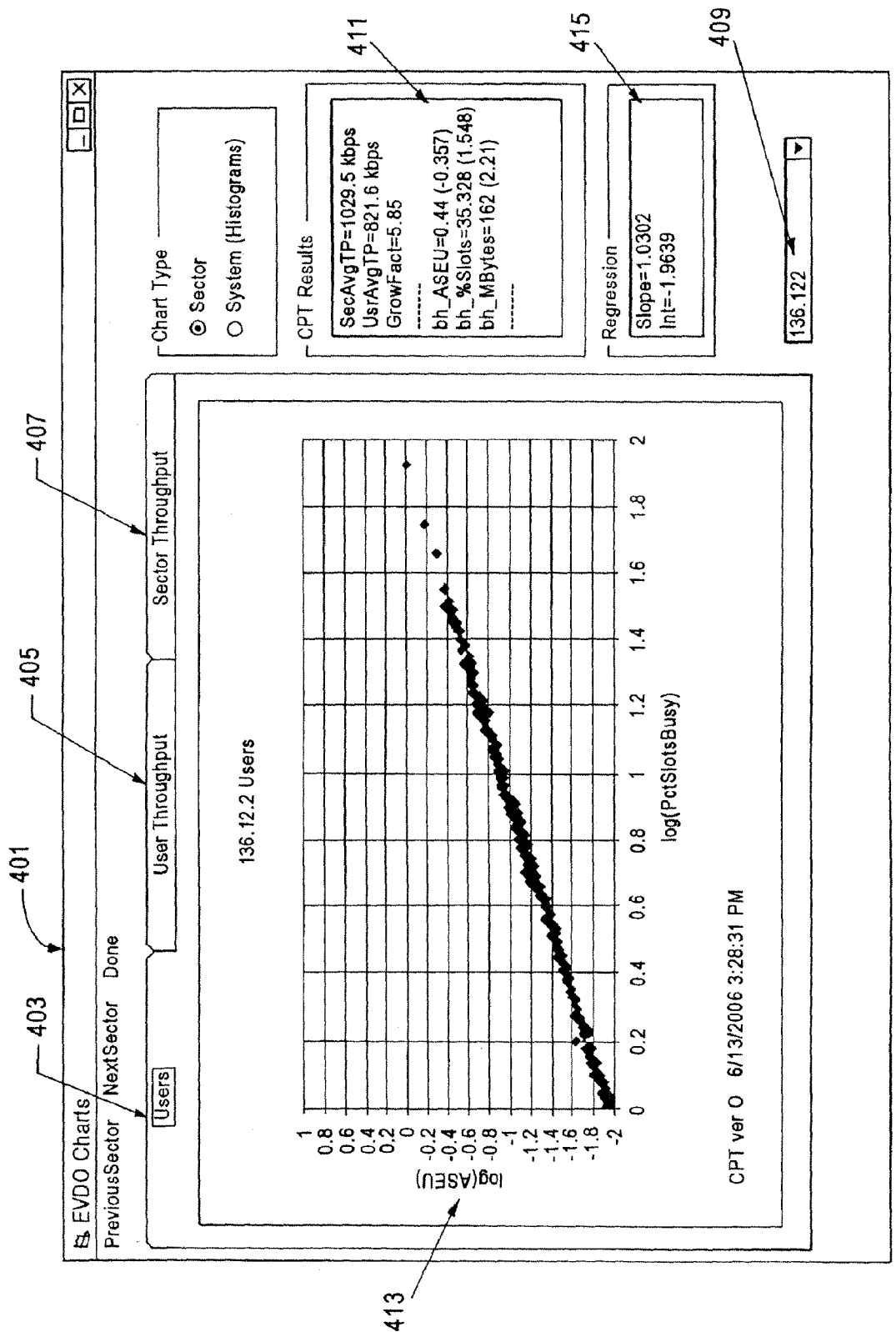
FIG. 4 is an exemplary window display showing a logarithmic regression of users vs. percentage of slots busy (% SlotsBusy).

In general, FIG. 4 depicts a logarithmic regression of users ("ASEU") vs. % SlotsBusy as might be produced at step S8 in the process of FIG. 2. The extrapolated result gives the user capacity (number of users when % SlotsBusy=100, or equivalently, log(% SlotsBusy)=2) as might result at step S13. FIG. 5 shows a logarithmic regression of Mbytes vs users ("ASEU"), or User Throughput as might be produced at step S7. The slope of this regression is in units of Mbytes/hour/user, which can be converted to kilobits/second/user. Note the regression slope (in the box on the lower right). A value less than one indicates that User Throughput decreases as the number of users increases. FIG. 6 illustrates a logarithmic regression of Mbytes vs % SlotsBusy, or Sector Throughput. The slope of this regression is in units of Mbytes/hour, which can be converted to kilobits/second as might be produced at step S6. This throughput is applicable to all users on average. Note the regression slope (in the box on the lower right). A value greater than one indicates that Sector Throughput increases as the slot utilization (PctSlotsBusy) increases. This is referred to as "Scheduling Gain."

It may be helpful to consider the format of the displays in somewhat more detail. Each of these drawings shows a display window 401, with three selectable tabs 403-407. Selection of tab 403 causes the terminal device to display Users related data as shown in FIG. 4. Selection of the tab 405 causes the terminal device to display User Throughput related data as shown in FIG. 5; whereas selection of the tab 407 causes the terminal device to display Sector Throughput related data as shown in FIG. 6.

In the examples, a box 409 in the lower right corner shows an identification of the switch, cell and sector. For simplicity, it is assumed that each of the cells is configured to use a single RF carrier, e.g. as a 1x implementation of EV-DO. Hence, in the example of FIG. 4, the data relates to switch 136, cell 12, and sector 2. By contrast, the examples of FIGS. 5 and 6 show data relating to the same switch 136 but relating to the cell 17, and sector 1 of that cell. Of course, it is a simple matter to extend the identification to include an identification of an RF carrier (possibly from among a plurality), for example, for a network deployment in which some or all of the cells are configured to use multiple RF carriers. The box 409 is a dialog box, in that it includes a down arrow allowing the user to select other switch, cell, sector combinations (and possibly from among multiple RF carriers) for which data is available.

Each tabbed window display shows a different graph and different associated regression data, as will be discussed. However, each display also includes a box 411 containing capacity (CPT) results, for the currently selected cell, carrier, sector. The data in the CPT results box 411 includes sector average throughput (SecAvgTP) in kbps, user average throughput (UsrAvgTP) in kbps and growth factor (GrowFact). The sector and user average throughputs are those determined in steps S15 and S14 in the process of FIG. 2. The growth factor is the value thereof that resulted from the processing of FIG. 3. The data in the CPT results box 411 also includes the average number of users in the busy hour (bh_ASEU), the percentage of slots busy in the busy hour (bh_% slots) and the busy hour throughput (bh_Mbytes). The data in the box 411 is the same in FIGS. 5 and 6, as those two displays relate to the same cell/carrier/sector, whereas the data in that box in FIG. 4 is different because the display represented by FIG. 4 represents performance of a different carrier/sector.

Each tabbed display also includes a plot of the relevant data points and a data box listing certain data obtained from the regression processing of the data. Hence, FIG. 4 shows a number of Users scatter plot 413, which is a plot of the logarithmic data, in this case the logarithm of the average number of users (log(ASEU) versus the logarithm of the percentage of slots busy (log(PctSlotsBusy). A data box 415 shows the regression data, derived from the linear regression of the logarithm of users ("ASEU") vs % SlotsBusy data, in this case the slope of the regression line and the vertical axis intercept (Int). Although not shown for ease of illustration, the display may also show a representation of the resulting regression line on the graph, either as an overlay or as a further display without the raw data points.

In the example, FIG. 5 includes a User Throughput graph 513 representing a scatter plot of the logarithmic data for user data (log(Mbytes)) versus the logarithm of the average number of users (log(ASEU)). A data box 515 shows the regression data, derived from the linear regression of the logarithm of user data versus the logarithm of the average number of users, in this case the slope of the regression line, the vertical axis intercept (Int) and the squared correlation coefficient (R2) which provides a confidence factor with regard to the results of the regression.

Although not shown for ease of illustration, the display shown by way of example in FIG. 5 may also show a representation of the resulting regression line on the graph, either as an overlay or as a further display without the raw data points. The slope of this regression in a line graph or in the data box 515 is in units of Mbytes/hour/user, which can be converted to kilobits/second/user. A value less than one for the regression slope in the box 515 indicates that User Throughput decreases as the number of users increases.

Similarly, the sector throughput tab display of FIG. 6 includes a Sector Throughput graph 613 representing a scatter plot of the logarithmic data for the amount of data (log (Mbytes) versus the percentage of slots that are busy (log (PctSlotsBusy). A data box 615 shows the regression data, derived from the linear regression of the logarithm of data versus the logarithm of the percentage of slots that are busy, in this case, the slope, the vertical axis intercept (Int) and the squared correlation coefficient (R2) for the results of the regression.

As in the earlier examples, although not shown for ease of illustration, the display shown by way of example in FIG. 6 may also show a representation of the resulting regression line on the graph, either as an overlay or as a further display without the raw data points. The slope of this regression in a line graph or in the data box 615 is in units of Mbytes/hour/user, which can be converted to kilobits/second. This throughput is applicable to all users on average. Here, a value greater than one indicates that Sector Throughput increases as the slot utilization (PctSlotsBusy) increases. This is referred to as "Scheduling Gain."

Various units of measure can be used with the above-discussed capacity analysis techniques with equivalent utility. Instead of Mbytes for data volume, one can use kilobits, bits, bytes, or any other conventional usage metric representing data traffic. Either time in seconds, or the relative time (% SlotsBusy) can be used with equal efficacy.

Linear regression processing is a well known data processing technique, and the discussion above assumes that those skilled in the art are generally familiar with linear regression algorithms. Although applied to other types of networks and as a result to other types of data, a more detailed discussion of linear regression processing may be found in Applicants' U.S. Pat. No. 6,996,374.

As shown by the above discussion, many of the aspects of the methodologies disclosed herein may be implemented by appropriate programming of one or more general purpose data processing computers. Such operations may be carried out by execution of software, firmware, or microcode operating on processors or computers; and code for implementing such operations may be in the form of computer instructions in any form (e.g. source code, object code, interpreted code, etc.) stored or embodied in any computer or machine readable medium.

Figures 7, 8:
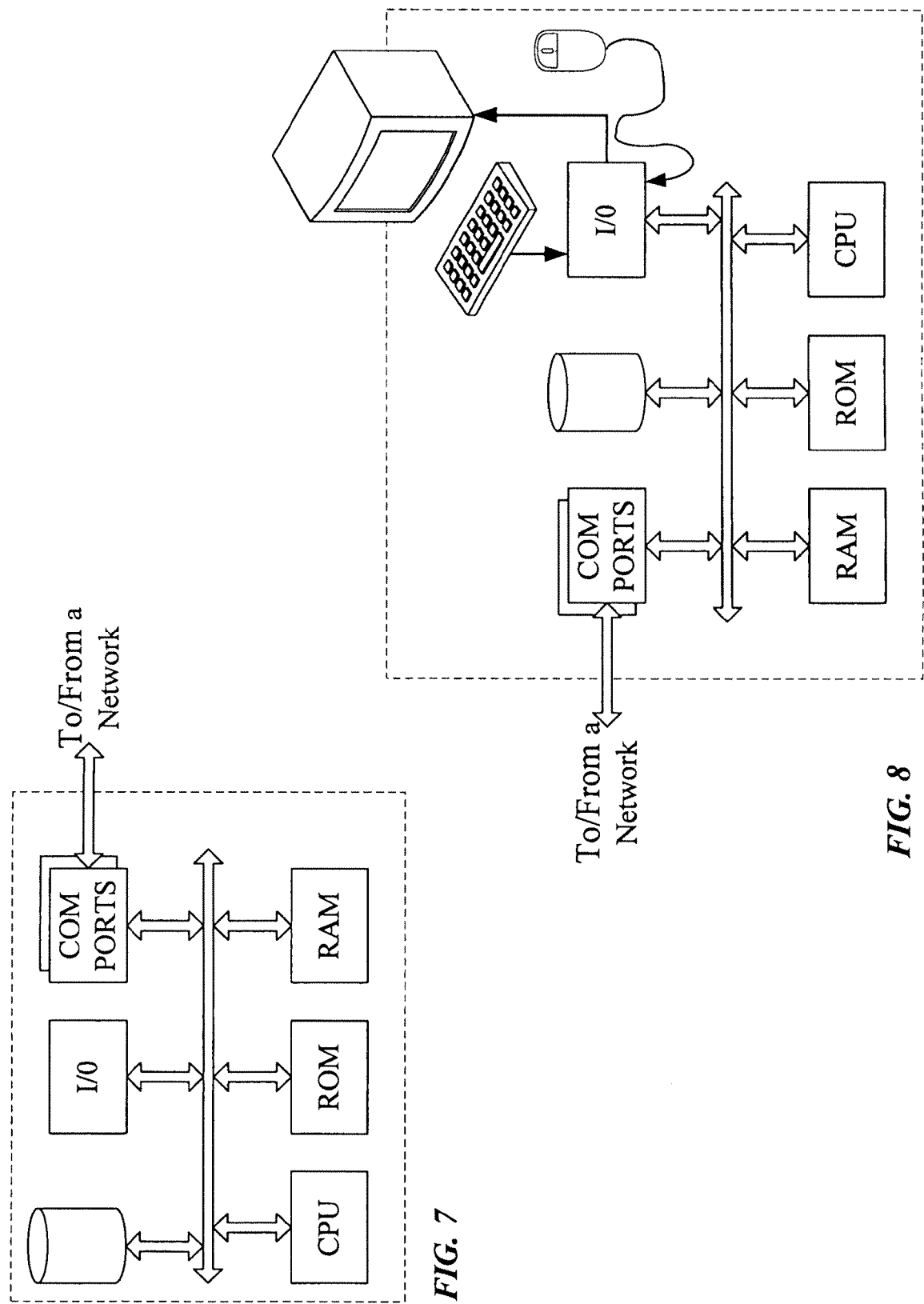
FIGS. 7 and 8 are simplified functional block diagrams of general purpose computes, as may be used to perform data processing functions for the data-only wireless network capacity analysis.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station, although computer of FIG. 8 may also act as a server if appropriately programmed.

In the example, the OMC server 33 implemented most of the processing functions related to the capacity analysis. The server 33 may be implemented using one or more such hardware platforms intended to represent a general class of data processing device commonly used to run "server" programming so as to implement the functions discussed above. Such a device typically utilizes general purpose computer hardware to perform its respective server processing and to control the attendant communications via the network(s). A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Those skilled in the art will recognize that the processing of the raw data for the capacity analysis may be implemented on other platforms, such as a PC or the like serving as the terminal device 31 or PC 27. As known in the data processing and communications arts, such a general-purpose computer typically comprises a central processing unit (CPU), an internal communication bus, various types of memory, disk drives or other code and data storage systems, and one or more network interface cards or ports for communication purposes. In the example, the terminal device 31 would include a local area network card for communication via the LAN 35 of the OMC 29. The implementation of the computer system for the terminal device 31 also includes or communications with a display and one or more user input devices such as alphanumeric and other keys of a keyboard, a mouse, a trackball, etc. The display and user input element(s) together form a user interface, for interactive control of the operation of the terminal device 31, for example, for obtaining capacity analyses as outlined above. These user interface elements may be locally coupled to the computer system as shown, for example in a workstation configuration of the terminal device 31, or the user interface elements may be remote from the computer and communicate therewith via a network.

Hence, aspects of the methods outlined above may be embodied in software programming, e.g. in the form of program code executable by the or other programmable device. Such software typically is carried on or otherwise embodied in a medium or media. Terms such as "machine-readable medium" and "computer-readable medium" as used herein generically refer to any tangible medium that participates in providing instructions and/or data to a programmable processor, such as the CPU or other processor of a server computer or user terminal device, for execution or other processing.

Such a medium may take many forms, including but not limited to, non-volatile storage media and volatile storage media. Non-volatile storage media include, for example, optical or magnetic disks and flash memory. Volatile storage media include dynamic memory, such as main memory or cache. Hence, common forms of machine-readable storage media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, an EEPROM, a FLASH-EPROM, a cache memory, or any other memory chip or cartridge.

The discussion above has focused on use of the capacity planning techniques/tools with respect to a data only type public mobile communication network, such as a 1xEV-DO type network. Those skilled in the art will recognize that the present teachings are also applicable to other wireless network technologies. For example, the present capacity planning technologies would work equally well in any time-domain multiple access scheme with user scheduling and adaptive modulation (e.g., WiMax or any 802.11-x scheme).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1xEV-DO—Single Carrier of Evolution—Data-only
ASEU—Average Scheduler-Eligible Users
BH—Busy Hour
BS—Base Station
BSC—Base Station Controller
BTS—Base Transceiver System
CD—Compact Disk
CDROM—Compact Disk Read Only Memory
CDMA—Code Division Multiple Access
CPT—Capacity Planning Tool
CPU—Central Processing Unit
DVD—Digital Video Disk.
DVD-ROM—Digital Video Disk—Read Only Memory
EV-DO—Evolution—Data-only
IP—Internet Protocol
LAN—Local Area Network
MS—Mobile Station
PC—Personal Computer
PSTN—Public Switched Telephone Network
RAM—Random Access Memory
PROM—Programmable Read Only Memory
EPROM—Erasable Programmable Read Only Memory
EEPROM—Electronically Erasable Programmable Read Only Memory
RF—Radio Frequency
ROM—Read Only Memory
VoIP—Voice over IP

What is claimed is:

1. A method comprising steps of:
collecting data regarding transmission of data over of an air-link resource of a base station serving one or more mobile stations in a data-only mobile wireless communication network during a plurality of time intervals, the collected data including at least two of three of:
(i) total transmitted data for each interval,
(ii) a measure of total time taken during each interval to transmit the data, and
(iii) average number of users being sent data over the air-link resource during each interval; and
processing the collected data to:
(a) determine a growth characteristic with respect to the air-link resource, and
(b) determine a number of users at which average throughput per user for data transmission on the air-link resource falls to a selected value of minimum acceptable data throughput per user.

2. The method of claim 1, wherein the processing to determine the growth characteristic comprises steps of:
performing a linear regression on data points relating to the logarithm of the total transmitted data for each interval versus the logarithm of the measure of total time taken during each interval to transmit data, for the plurality of time intervals;
determining an average throughput for data transmission using the air-link resource from the slope of the linear regression;
determining a maximum number of users the air-link resource can support from the average throughput;
determining a current number of users supported by the air-link resource; and
determining a growth factor based on the maximum number of users and the current number of users.

3. The method of claim 2, wherein the step of determining the maximum number of users the air-link resource can support comprises dividing the value of throughput by a value of minimum acceptable data throughput per user.

4. The method of claim 3, wherein the value of minimum acceptable data throughput per user is a minimum threshold value.

5. The method of claim 3, wherein the value of minimum acceptable data throughput per user comprises at least one probability bound on current and forecast user throughput determined using variance of the data points of the regression.

6. The method of claim 2, wherein:
the step of determining the average throughput comprises determining the average throughput for the data transmission using the air-link resource from the slope of the linear regression; and
the step of determining the current number of users comprises identifying an average number of users being sent data over the air-link resource during a busy one of the intervals.

7. The method of claim 2, wherein the step of determining the growth factor comprises dividing the maximum number of users by the current number of users.

8. The method of claim 1, wherein the processing to determine the number of users at which average throughput per user for data transmission on the air-link resource falls to the selected value of minimum acceptable data throughput per user comprises steps of:
performing a linear regression on data points relating to the logarithm of the average number of users versus the logarithm of the measure of total time taken during each interval to transmit the data, for the plurality of time intervals; and
extrapolating from the linear regression to determine the number of users expected to be able to receive data transmission on the air-link resource, when the throughput per user falls to the selected value of minimum acceptable data throughput per user.

9. The method of claim 1, wherein the air-link resource of the base station is a radio frequency carrier used for transmission of data to the mobile stations via a sector of the base station.

10. The method of claim 1, further comprising a step of, based on a rate at which number of users is increasing or expected to increase over time, planning to deploy additional resources before number of users will reach the determined number of users at which average throughput per user for data transmission on the air-link resource falls to the selected value of minimum acceptable data throughput per user.

11. A product comprising:
a non-transitory machine readable medium; and
executable program embodied in the medium, wherein when executed by a programmable computer, the program causes a computer to perform functions for providing a time-trending analysis of capacity of an air-link resource of a base station in a data-only mobile wireless communication network, the base station serving one or more wireless mobile stations, the functions comprising functions to:
collect data regarding transmission of data over of the air-link resource of the base station for the one or more mobile stations during a plurality of time intervals, the collected data including at least two of three of:
(i) total transmitted data for each interval,
(ii) a measure of total time taken during each interval to transmit the data, and
(iii) average number of users being sent data over the air-link resource during each interval; and
process the collected data to:
(a) determine a growth characteristic with respect to the air-link resource, and
(b) determine a number of users at which average throughput per user for data transmission on the air-link resource falls to a selected value of minimum acceptable data throughput per user.

12. The product of claim 11, wherein the function to process collected data to determine the growth characteristic comprises functions to:
perform a linear regression on data points relating to the logarithm of the total transmitted data for each interval versus the logarithm of the measure of total time taken during each interval to transmit data, for the plurality of time intervals;
determine an average throughput for data transmission using the air-link resource from the slope of the linear regression;
determine a maximum number of users the air-link resource can support from the average throughput;
determine a current number of users supported by the air-link resource; and
determine a growth factor based on the maximum number of users and the current number of users.

13. The product of claim 12, wherein the function to determine the maximum number of users the air-link resource can support comprises dividing the value of throughput by a value of minimum acceptable data throughput per user.

14. The product of claim 13, wherein the value of minimum acceptable data throughput per user is a minimum threshold value.

15. The product of claim 13, wherein the value of minimum acceptable data throughput per user comprises at least one probability bound on current and forecast user throughput determined using variance of the data points of the regression.

16. The product of claim 12, wherein:
the function to determine the average throughput comprises determining the average throughput for the data transmission using the air-link resource from the slope of the linear regression; and
the function to determine the current number of users comprises identifying an average number of users being sent data over the air-link resource during a busy one of the intervals.

17. The product of claim 12, wherein the function to determine the growth factor comprises dividing the maximum number of users by the current number of users.

18. The product of claim 11, wherein the function to process collected data to determine the number of users at which average throughput per user for data transmission on the air-link resource falls to the selected value of minimum acceptable data throughput per user comprises functions to:
perform a linear regression on data points relating to the logarithm of the average number of users versus the logarithm of the measure of total time taken during each interval to transmit the data, for the plurality of time intervals; and
extrapolate from the linear regression to determine the number of users expected to be able to receive data transmission on the air-link resource, when the throughput per user falls to the selected value of minimum acceptable data throughput per user.

19. The product of claim 11, wherein the air-link resource of the base station is a radio frequency carrier used for transmission of data to the mobile stations via a sector of the base station.

20. A machine comprising:
a programmable processor;
a storage medium coupled to the processor; and
an executable program stored by the medium, wherein execution of the program by the processor causes the processor to implement functions for providing a time-trending analysis of capacity of an air-link resource of a base station in a data-only mobile wireless communication network, the base station serving one or more wireless mobile stations, the functions comprising functions to:
collect data regarding transmission of data over of the air-link resource of the base station for the one or more mobile stations during a plurality of time intervals, the collected data including at least two of three of:
(i) total transmitted data for each interval,
(ii) a measure of total time taken during each interval to transmit the data, and
(iii) average number of users being sent data over the air-link resource during each interval; and
process the collected data to:
(a) determine a growth characteristic with respect to the air-link resource, and
(b) determine a number of users at which average throughput per user for data transmission on the air-link resource falls to a selected value of minimum acceptable data throughput per user.

* * * * *